US012353526B2

(12) United States Patent
Simakov et al.

(10) Patent No.: US 12,353,526 B2
(45) Date of Patent: Jul. 8, 2025

(54) USE OF MULTIFACTOR AUTHENTICATION IN ASSESSING SUSPICIOUS ACTIVITY

(71) Applicant: CrowdStrike, Inc., Sunnyvale, CA (US)

(72) Inventors: Marina Simakov, Ashdod (IL); Yaron Zinar, Petah Tikva (IL)

(73) Assignee: CrowdStrike, Inc., Sunnyvale, CA (US)

( * ) Notice: Subject to any disclaimer, the term of this patent is extended or adjusted under 35 U.S.C. 154(b) by 247 days.

(21) Appl. No.: 18/157,667

(22) Filed: Jan. 20, 2023

(65) Prior Publication Data

US 2024/0250943 A1 Jul. 25, 2024

(51) Int. Cl.
  *G06F 21/31* (2013.01)
  *G06F 21/62* (2013.01)
  *H04L 9/40* (2022.01)

(52) U.S. Cl.
  CPC .............. *G06F 21/31* (2013.01); *G06F 21/62* (2013.01); *H04L 63/10* (2013.01)

(58) Field of Classification Search
  None
  See application file for complete search history.

(56) References Cited

U.S. PATENT DOCUMENTS

| 2010/0162289 | A1* | 6/2010 | Sanders | ............... | H04N 21/812 |
| | | | | | 725/23 |
| 2022/0343319 | A1* | 10/2022 | Murao | ................... | H04L 67/02 |
| 2023/0034530 | A1* | 2/2023 | Gehtman | ................ | G06F 21/64 |
| 2023/0244775 | A1* | 8/2023 | Alexander | ............ | G06F 21/316 |
| | | | | | 726/18 |

FOREIGN PATENT DOCUMENTS

| CN | 103856438 A | * | 6/2014 | | |
| WO | WO-2022087510 A1 | * | 4/2022 | ............. | G06F 21/34 |

\* cited by examiner

*Primary Examiner* — Benjamin E Lanier
(74) *Attorney, Agent, or Firm* — Lee & Hayes, P.C.

(57) ABSTRACT

A security agent configured to initiate multifactor authentication (MFA) in response to security triggers occurring on a computing device. Upon occurrence of a security trigger, the security agent delays action associated with a process on the computing device and provides, to a display of a user of the computing device, a prompt asking if the security trigger resulted from an action of the user. The security agent then initiates MFA with an MFA provider to authenticate the user and, based at least on a result of the MFA and the user answer to the prompt, takes further action. The user answer may be provided separately from the MFA or through successful completion of the MFA.

20 Claims, 4 Drawing Sheets

USE OF MULTIFACTOR AUTHENTICATION IN ASSESSING SUSPICIOUS ACTIVITY

BACKGROUND

Malicious software (malware) can often be difficult to detect. When a security agent on an endpoint device detects a known malware process or activity, it can block execution of that process. Processes and activities, such as local security authority subsystem service (lsass) dumps, accesses to sensitive files, or installations of drivers on a computing device, can be malicious or benign. Blocking execution in these inconclusive cases may significantly hamper user experience and system operation, but allowing continued execution may result in unchecked malware activity.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes a security agent configured to initiate MFA in response to security triggers occurring on a computing device.

Various activities and processes on a computing device may be malicious or benign. Some actions taken by malware for its purposes can also be taken by information technology (IT) personnel for helpful reasons. While a security agent for the computing device may simply block execution of processes known to be associated with malware, additional input would be helpful before deciding whether a process that could be malicious or benign is malware. As described here, the security agent is configured to seek that additional input from the user and verify the user's identity with MFA.

The security agent may have a policy or configuration that defines security triggers associated with the process or activity surfaced for user input. These may be existing mechanisms of the security agent or additional hooks, application programming interfaces (APIs), plugins, filter drivers, etc. Upon detecting occurrence of a security trigger or set of security triggers, the security agent can delay action of a process associated with the security trigger(s) (e.g., suspend execution of the process) and initiate MFA.

In various implementations, before initiating MFA or as part of MFA, the security agent can provide a prompt to a display of the user of the computing device asking if the security trigger resulted from an action of the user. This display can be a display of the computing device having the security agent or a display of another device, such as a device being used to perform MFA. The user can respond through, e.g., a selection of an option (e.g., "yes" or "no") to indicate whether the user is responsible for the process/activity associated with the security trigger. If the display is part of a device used for MFA, successful authentication may double as an indication that the user is responsible for the process/activity. In some implementations, lack of user response to the prompt or MFA can be taken as an indication that the user is not present and can lead to additional security measures (e.g., suspending or blocking execution of the process, locking the computing device, etc.).

The security agent further initiates MFA with an MFA provider, which may be an external computing system connected to the computing device by a network. When the prompt inquiring about user responsibility for a process/activity is provided through a device used for MFA, the prompt may be provided after initiating MFA. When the prompt is provided on the computing device with the security agent, the prompt may be provided before initiating MFA or concurrently with initiating MFA.

The MFA provider may be the same as a security service associated with the security agent or may be a third party. The MFA provider may require authentication activities on multiple user devices, such as on the computing device and on a different user device (e.g., a phone, a watch, etc.) or on multiple different user devices. Such activity could be a login, face identification, a fingerprint identification, password or personal identification number (PIN) entry, etc. The MFA provider could also determine if the different user device and the computing device are at a same location (or if the multiple different user devices are at a same location). The MFA provider may then respond with an indication of successful authentication of the user or authentication failure.

In some implementations, the security service or security agent may track a number of authentication failures and, if a threshold number of failures occur, may take additional security measures.

In further implementations, rather than interacting with a user of the computing device, the security agent and security service may interact with an administrative user an entity associate with the user (e.g., an employer of the user). In such implementations, the prompt may be provided to a display screen of an administrative user device for an indication of whether the process/activity was intended by the administrative user or user and the MFA provider may authenticate an identity of the administrative user.

Upon receiving the MFA response, the security agent may take action. If the MFA response indicates that the user is authenticated and the user response indicates that the user is responsible for the process or activity, the security agent may allow action of the process to proceed forward. Otherwise, if the user indicates that the user is not responsible for the process or activity or if authentication of the user identity by MFA fails, the security agent may e.g., block execution of the process. In some implementations, the results of the user response to the prompt and the MFA can result in whitelisting or blacklisting the process/activity.

Overview

Figure 1:
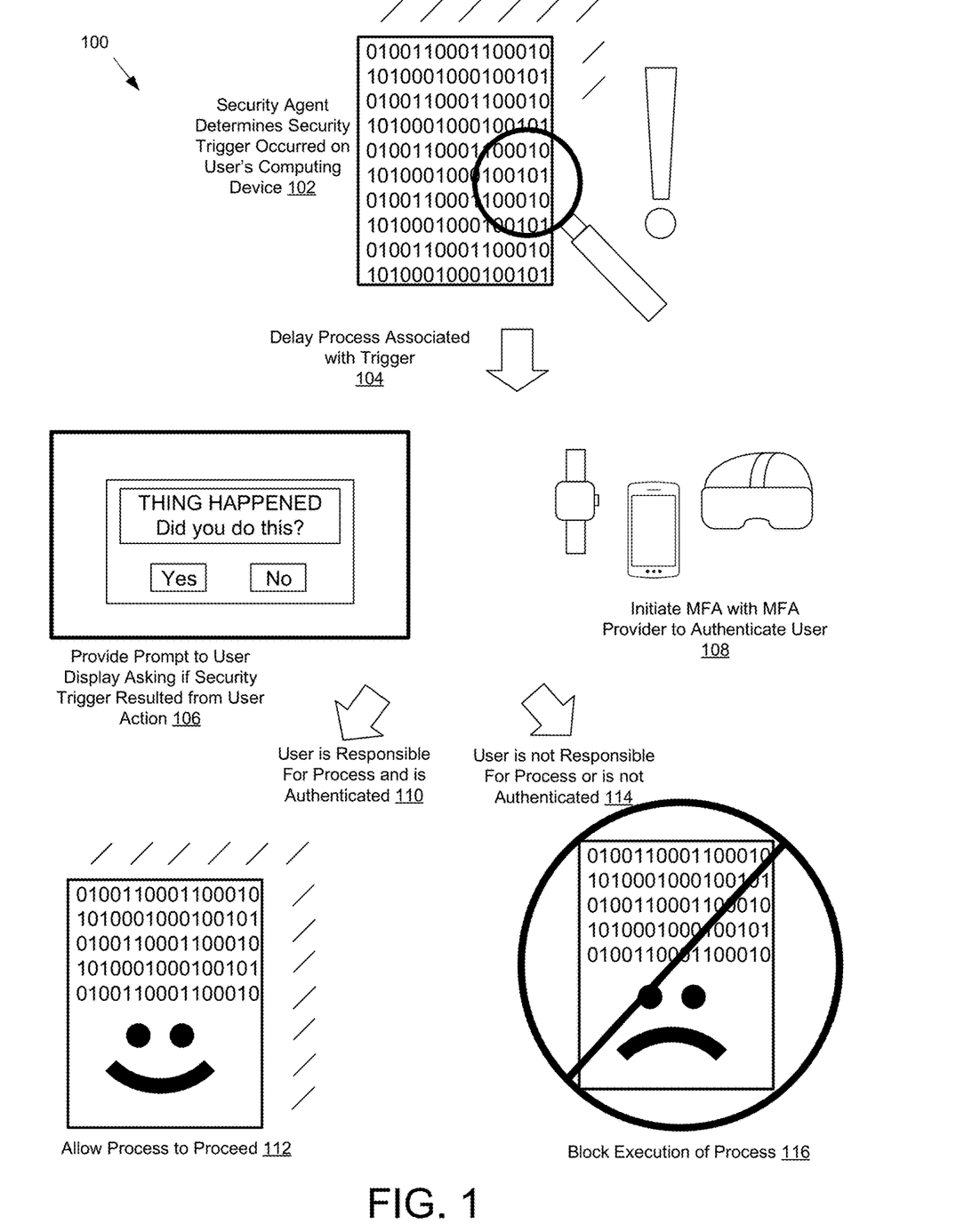
FIG. 1 illustrates an overview of multifactor authentication (MFA) interactions associated with a security trigger on a user's computing device.

FIG. 1 illustrates an overview 100 of multifactor authentication (MFA) interactions associated with a security trigger on a user's computing device. As illustrated, at 102, a security agent of a computing device determines that a security trigger has occurred on the computing device. In response, at 104, the security agent delays action of a process associated with the security trigger. At 106, the security agent provides a prompt to a display of a user of the computing device asking if the security trigger resulted from an action of the user, and at 108, the security agent initiates MFA with an MFA provider to authenticate the user. At 110, if the user indicates that the security trigger resulted from an action of the user and the MFA authenticates the user, the security agent allows, at 112, the action of the process to proceed. At 114, if the user indicates that the security trigger did not result from an action of the user or if the MFA does not authenticate the user, the security agent blocks, at 116, execution of the process.

In various implementations, a computing device of a user may have a security agent installed on that device to detect activity of malware. As noted herein, some activity could either be benign or malicious, and the security agent may need additional input to classify it. Such activities requiring additional input can be defined by a configuration or policy of the security agent as security triggers, and such security triggers can be detected using hooks, APIs, plugins, filter drivers, etc. At 102, a mechanism of the security agent (e.g., a hook) can observe an event and, in conjunction with its configuration or policy, determine the occurrence of a security trigger. In some examples, the security trigger may be one of a lsass dump, access to a sensitive file, or installation of a driver on the computing device. These are examples are in no way limiting, however—the configuration or policy of the security agent may identify an activity that occurs on the computing device as a security trigger.

Additionally, blacklisted processes or activities known to be a result of malware may simply be blocked without user input or MFA. Such user input and MFA may be used for a subset of processes/activities when the processes/activities could be malicious or benign.

At 104, once the security agent detects the occurrence of a security trigger, it delays action of a process associated with a security trigger (e.g., suspends execution of the process).

In various implementations, at 106, the security agent provides a prompt to a display of a user of the computing device. Such a prompt may be, e.g., a pop-up graphic user interface (GUI) including text, such as a description of what has happened and a question asking the user if the user is responsible for the thing described. The GUI may also include selectable options, such as clickable/pressable GUI buttons, radio buttons, check boxes, etc. After the user selects an answer, the security agent may either provide a login GUI to the user's display as a first MFA factor, at 108, or redirect to the MFA provider. If a login GUI is presented (asking, e.g., for a username and password), the security agent may either authenticate the username and password on the computing device, may provide those credentials to a remote security service for authentication, may provide the credentials to the MFA provider for authentication, or may provide the credentials to a different third party for authentication. If authentication is successful, the security agent may communicate with an MFA provider to enable second factor authentication, at 108. Such second factor authentication may involve the MFA provider interacting with the user through another user device, such as a phone, a watch, goggles, glasses, or another device to obtain, e.g., a face identification, a fingerprint, a PIN, or another login. In some implementations, the login GUI on the computing device may also be initiated and processed by the MFA provider. After both primary and secondary factors have been authenticated or failed, the MFA provider sends an indication of success or failure, either directly to the computing device or first to the remote security service, which may then notify the computing device. In further examples, no login GUI may be provided and either after the user has provided an answer to the prompt or concurrently with displaying the prompt, the security agent communicates with the MFA provider to enable MFA, with both factors involving interaction with other devices (e.g., watch and phone, etc.). In yet other examples, the prompt may be provided on a display of a device used for MFA (e.g., a user watch) with successful authentication providing a mode of user acceptance of responsibility.

In further implementations, the security agent may allow the user to select an MFA provider or select another user device for second factor authentication. Such selections may be offered to the user through a GUI provided to a user display device. For example, the GUI could offer the user the option of the user's watch or phone for second factor authentication. The list of other devices may be provided to the computing device by the MFA provider, may be known to the security agent or computing device, may be known to the remote security service, or may be entered by the user.

In some implementations, rather than providing a prompt to a display of the computing device and authenticating the user of the computing device, the security agent and remote security service may send a prompt to a display of an administrative user and enable an MFA provider to authenticate the administrative user. Such an administrative user may be, e.g., an IT professional for an employer of the user/owner of the computing device.

Additionally, if the user does not respond to the prompt or to MFA communications, this may be taken as a lack of user presence and result in security measures (e.g., blocking the process associated with the security trigger, logging the user out from the computing device, etc.). Lack of user presence at the computing device may be deemed, like a negative response to the prompt or failure of MFA authentication, as an indication that the process associated with the security trigger is malicious. Further, even if there is a response to the prompt but a failure or threshold number of failures of the MFA authentication, the security agent may take an additional security measure (e.g., blocking the process associated with the security trigger, logging the user out from the computing device, etc.).

At 110, the security agent may note that the user has responded positively to the prompt (e.g., selected "yes" when asked if the user is responsible for the security activity/process associated with the security trigger) and that it has received an indication from the MFA provider (either directly from the MFA provider or through the remote security service) that the user has been authenticated. As a result, the security agent may take action, at 112, allowing the process to proceed/continue with its activity.

In various implementations, at 114, the security agent may note that the user has responded negatively to the prompt (e.g., selected "no" when asked if the user is responsible for the security activity/process associated with the security trigger) or not responded to the prompt. As a result, at 116, the security agent may take action, blocking execution of the process associated with the security trigger. Additionally or alternatively, the security agent may take a different or further action at 116 in accordance with a configuration or policy of the security agent.

Also, at 114, the security agent may note that MFA authentication has failed and at 116, as a result, the security agent may take action, blocking execution of the process associated with the security trigger. Additionally or alternatively, the security agent may take a different or further action at 116 in accordance with a configuration or policy of the security agent.

In some implementations, as a result of taking action at 112 or 116, the security agent may add the allowed/blocked process to a whitelist or blacklist. If allowed at 112, the security agent may add the process to a whitelist to ensure that when the security trigger is encountered again, it does not result in initiation of MFA. If blocked at 116, the security agent may add the process to a blacklist to ensure that when the security trigger is encountered again or simply the process itself, it is blocked without the need to initiate MFA. In some examples, notification of the action at 112 or 116 may be provided to the remote security service, which may be responsible for deciding whether to add the process to a whitelist or blacklist. Further, based on a decision of the remote security service or based on a configuration or policy of the security agent, the number of positive determinations at 110 or negative determinations at 114 may vary. For example, the process may require multiple (e.g., two) MFA authentications by the same user or by two different users before the process is added to a whitelist or may require several (e.g., five) failures of MFA authentications by the same user or multiple users before the process is added to a blacklist.

Example Environment

Figure 2:
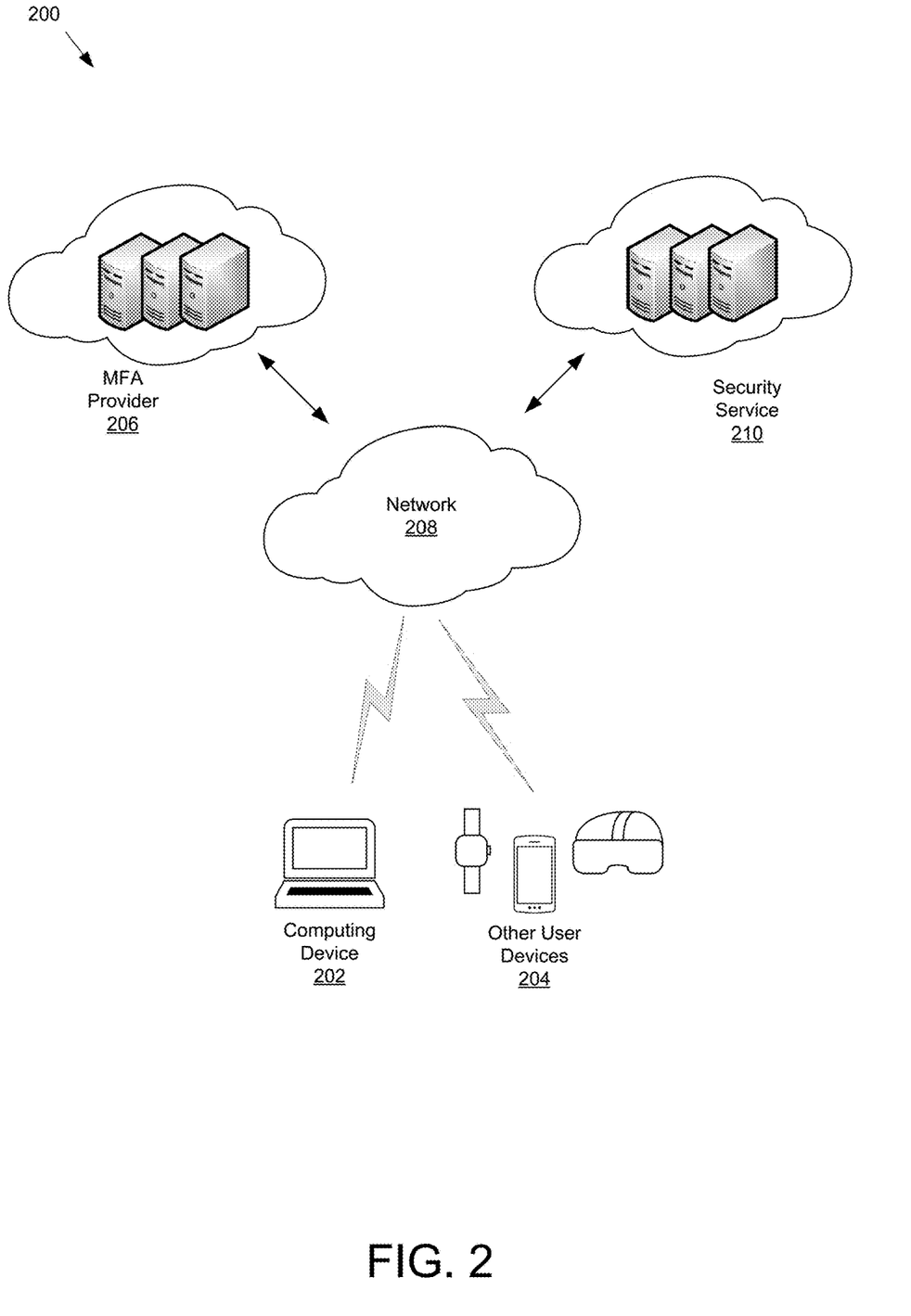
FIG. 2 shows an example of a network environment including a computing device configured with a security agent, other device(s) of the computing device user, a remote security service, and an MFA provider.

FIG. 2 shows an example of a network environment 200 including a computing device configured with a security agent, other device(s) of the computing device user, a remote security service, and an MFA provider. As illustrated, computing device 202 of a user and other user devices 204 may be used by an MFA provider 206 to authenticate the user when a security agent of a computing device determines occurrence of a security trigger and asks the user whether the security trigger resulted from an action of the user. The computing device 202 and other user devices 204 may be connected to the MFA provider 206 through a network 208, and the computing device 202 may also be connected to a remote security service 210 through the network 208. The remote security service 210 may provide a configuration or policy to the security agent the defines security triggers and may in some implementations, communicate with the MFA provider 206 and the other user devices 204 via the network 208.

Figure 3:
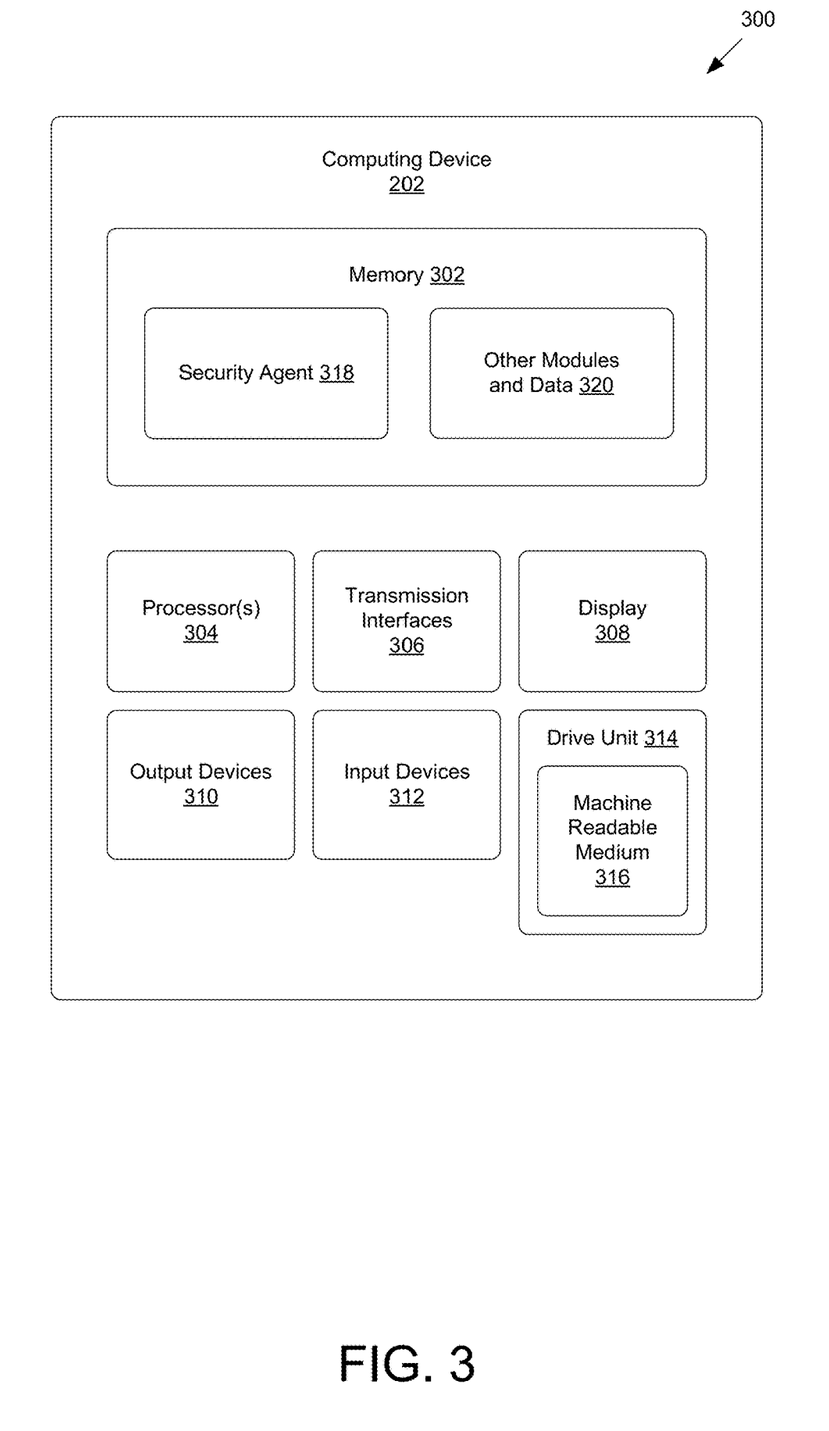
FIG. 3 shows an example of a system architecture for the computing device.

In various implementations, the computing device 202 may be any sort of computing device, such as a mobile phone (e.g., a smart phone or other cellular phone), a personal computer (PC), a laptop computer, a desktop computer, a tablet computer, a personal digital assistant (PDA), a media player, a gaming device, a smart watch, a hotspot, an Internet of Things (IoT) device, a wearable device, an extended reality (XR) device, an augmented reality (AR)/virtual reality (VR) device, a workstation, or any other type of computing device. An example computing device 202 is illustrated in FIG. 3 and described further herein with reference to that figure.

The other user devices 204 may also be any sort of computing devices, such as a mobile phone (e.g., a smart phone or other cellular phone), a PC, a laptop computer, a desktop computer, a tablet computer, a PDA, a media player, a gaming device, a smart watch, a hotspot, an IoT device, a wearable device, an XR device, an AR/VR device, a workstation, or any other type of computing device. While the computing device 202 may be used for a first factor in MFA (e.g., for entering a username and password, or a face capture), another user device 204 is used for a second factor in MFA, and any such device 204 may be used so long as it is able to capture information from a user, such as textual input, spoken input, visual input, touch input, etc. In some examples, other user devices 204 may be used for both factors in a two-factor MFA.

In some implementations, the MFA provider 206 may be any sort of computing device or computing devices providing an MFA service. The computing device or computing devices may be a service cloud, single device, or other grouping of devices. The MFA provider may be operated by an entity associated with the security service 210 and/or with a security agent on the computing device 202, by an entity associated with a connectivity provider for the computing device 202, or by a third-party entity.

The network 208 may be any sort of network or group of networks, such as a public wide area network (WAN), a private WAN, a local area network (LAN), a cellular communication network (which may include a core network connected to multiple access points providing connectivity using radio frequency (RF)), a local unlicensed wireless network, such as a home or business Wi-Fi network. Any one or more of these or other networks connected to each other and to the computing device 202, other user devices 204, MFA provider 206, and remote security service 210 may serve as network 208.

In further implementations, the security service 210 may be any sort of computing device or computing devices providing a security service. The computing device or computing devices may be a service cloud, single device, or other grouping of devices. The security agent of the computing device 202, which is described throughout this application, may be a client application of the service application implemented by the security service 210. The security service 210 may provide the configuration or policy implemented by the security agent of the computing device 202, may receive notifications of events occurring on the computing device 202, and may communicate with other devices (e.g., the MFA provider 206) on behalf of the security agent. In some examples, the security service 210 may take actions through the security agent on computing device 202 to implement security actions (e.g., blocking a process, rebooting a device, updating a configuration or policy, sandboxing a suspected exploit, etc.).

Example Architectures

FIG. 3 shows an example of a system architecture 300 for a computing device, such as computing device 202. The computing device 202 can have at least one memory 302, processor(s) 304, one or more transmission interfaces 306, a display 308, output devices 310, input devices 312, and/or a drive unit 314 including a machine readable medium 316.

In various examples, the memory 302 can include system memory, which may be volatile (such as RAM), non-volatile (such as ROM, flash memory, etc.) or some combination of the two. The memory 302 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium that can be used to store the desired information and accessed by the computing device 202. Any such non-transitory computer-readable media may be part of the computing device 202.

The memory 302 can include one or more software or firmware elements, such as computer-readable instructions that are executable by the one or more processors 304. For example, the memory 302 can store computer-executable instructions associated with a security agent 318. Such a security agent 318 is described in greater detail throughout the disclosure. The memory 302 can also store other modules and data 320, which can be utilized by the computing device 202 to perform or enable performing any action taken by the computing device 202. The other modules and data 320 can include an operating system, applications, and data utilized by the operating system and applications.

In various examples, the processor(s) 304 can be a CPU, a graphics processing unit (GPU), or both CPU and GPU, or any other type of processing unit. Each of the one or more processor(s) 304 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 304 may also be responsible for executing all computer applications stored in the memory 302, which can be associated with types of volatile (RAM) and/or nonvolatile (ROM) memory.

The transmission interfaces 306 can include transceivers, modems, interfaces, antennas, and/or other components that perform or assist in exchanging wireless communications with base stations, Wi-Fi access points, etc. The transmission interfaces 306 can also include components for wired communications, such as Ethernet interfaces for receiving Ethernet plugs.

The display 308 can be a liquid crystal display or any other type of display commonly used with computing devices. For example, the display 308 may be a touch-sensitive display screen and can thus also act as an input device or keypad, such as for providing a soft-key keyboard, navigation buttons, or any other type of input.

The output devices 310 can include any sort of output devices known in the art, such as the display 308, speakers, a vibrating mechanism, and/or a tactile feedback mechanism. Output devices 310 can also include ports for one or more peripheral devices, such as headphones, peripheral speakers, a peripheral display, a printer, a watch, a headset, etc.

The input devices 312 can include any sort of input devices known in the art. For example, input devices 312 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism. The input devices 312 can also include peripheral devices such as keyboards, mice, headsets, game controllers, watches, cameras, etc.

The machine readable medium 316 of a drive unit 314 can store one or more sets of instructions, such as software or firmware, that embodies any one or more of the methodologies or functions described herein. The instructions can also reside, completely or at least partially, within the memory 302, processor(s) 304, and/or transmission interface(s) 306 during execution thereof by the computing device 202.

Example Operations

Figure 4:
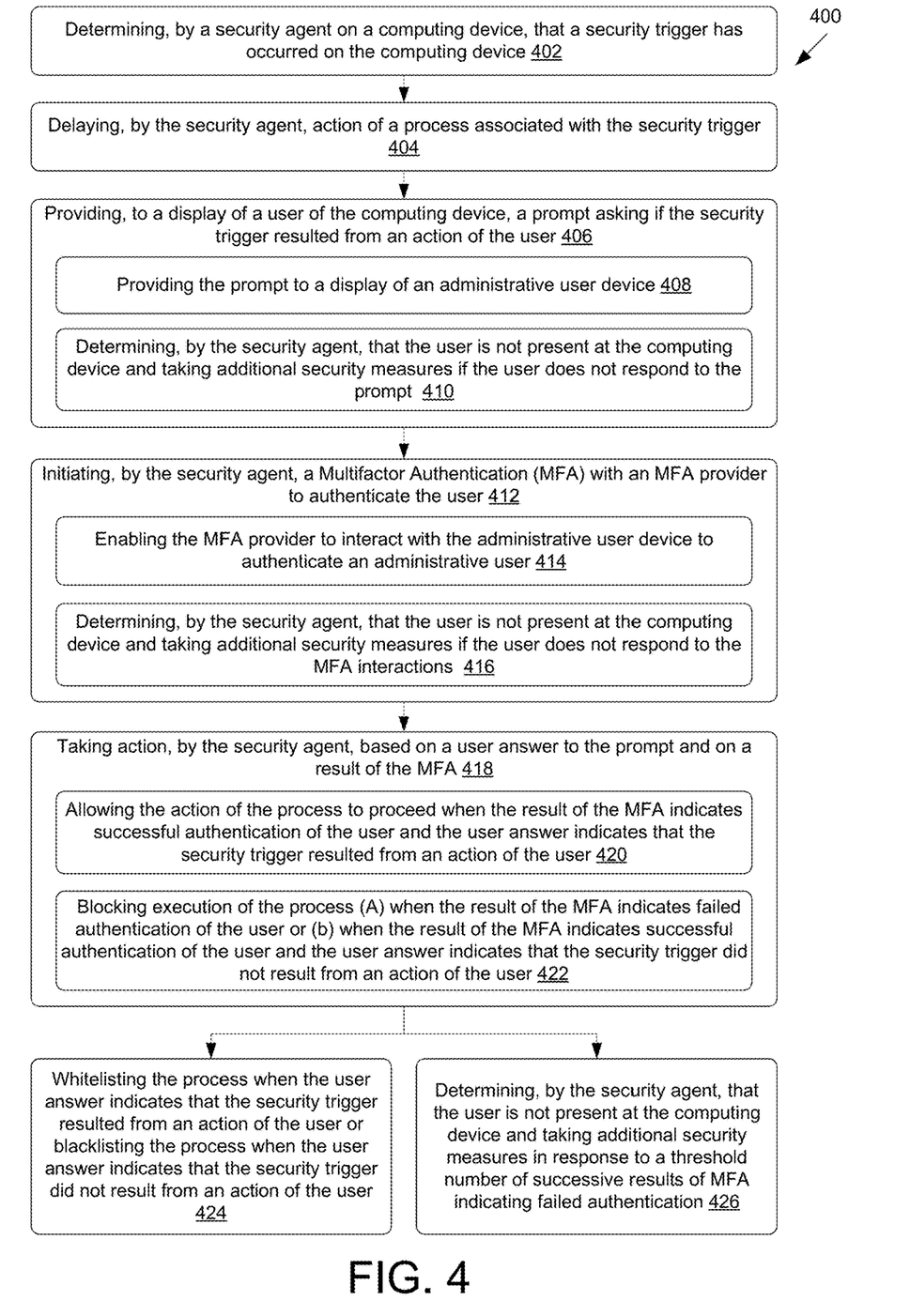
FIG. 4 shows a flowchart of an example method in which a computing device with a security agent initiates MFA in response to security triggers occurring on a computing device.

FIG. 4 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 4 shows a flowchart 400 of an example method in which a computing device with a security agent initiates MFA in response to security triggers occurring on a computing device. At 402, the security agent of the computing device determines that a security trigger has occurred on the computing device. The security trigger may be one of a lsass dump, access to a sensitive file, or installation of a driver on the computing device.

At 404, the security agent delays action of a process associated with the security trigger. For example, the security agent may suspend execution of the process associated with the security trigger.

At 406, the security agent provides, to a display of a user of the computing device, a prompt asking if the security trigger resulted from an action of the user. At 408, the providing may include providing the prompt to a display of an administrative user device. Further, at 410, the security agent may determine that the user is not present at the computing device and take additional security measures if the user does not respond to the prompt.

At 412, the security agent initiates MFA with an MFA provider to authenticate the user. In one example, initiating MFA includes enabling the user to select the MFA provider. At 414, the initiating may include enabling the MFA provider to interact with an administrative user device to authenticate the administrative user. At 416, the security agent may determine that the user is not present at the computing device and take additional security measures if the user does not respond to the MFA interactions.

At 418, the security agent then takes action based on a user answer to the prompt and on a result of the MFA. In some implementations, the security trigger and the action are determined by a configuration or policy of the security agent. At 420, taking the action comprises allowing the action of the process to proceed when the result of the MFA indicates successful authentication of the user and the user answer indicates that the security trigger resulted from an action of the user. Alternatively, at 422, taking the action comprises blocking execution of the process (a) when the result of the MFA indicates failed authentication of the user or (b) when the result of the MFA indicates successful authentication of the user and the user answer indicates that the security trigger did not result from an action of the user.

At 424, the security agent may whitelist the process when the result of the MFA indicates successful authentication of the user and the user answer indicates that the security trigger resulted from an action of the user. Alternatively, the security agent may blacklist the process when the result of the MFA indicates successful authentication of the user and the user answer indicates that the security trigger did not result from an action of the user.

At 426, in response to a threshold number of successive results of MFA indicating failed authentication, the security agent may determine that the user is not present at the computing device and taking additional security measures.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
    determining, by a security agent on a computing device, that a security trigger has occurred on the computing device;
    delaying, by the security agent, action of a process associated with the security trigger;
    providing a prompt to a display of a user of the computing device asking if the security trigger resulted from an action of the user;
    initiating, by the security agent, a multifactor authentication (MFA) with an MFA provider to authenticate the user;
    taking action, by the security agent, based on a user answer to the prompt and on a result of the MFA, wherein the user answer is provided separately from the MFA or through successful completion of the MFA; and at least one of:
        whitelisting the process when the result of the MFA indicates successful authentication of the user and the user answer indicates that the security trigger resulted from an action of the user; or
        blacklisting the process when the result of the MFA indicates successful authentication of the user and the user answer indicates that the security trigger did not result from an action of the user.

2. The method of claim 1, wherein the security trigger is one of a local security authority subsystem service (lsass) dump, access to a sensitive file, or installation of a driver on the computing device.

3. The method of claim 1, wherein the security trigger and the action are determined by a configuration or policy of the security agent.

4. The method of claim 1, wherein initiating the MFA includes enabling the user to select the MFA provider.

5. The method of claim 1, wherein taking the action comprises allowing the action of the process to proceed when the result of the MFA indicates successful authentication of the user and the user answer indicates that the security trigger resulted from an action of the user.

6. The method of claim 1, wherein taking the action comprises blocking execution of the process (A) when the result of the MFA indicates failed authentication of the user or (B) when the result of the MFA indicates successful authentication of the user and the user answer indicates that the security trigger did not result from an action of the user.

7. The method of claim 1, further comprising, in response to a threshold number of successive results of MFA indicating failed authentication, determining, by the security agent, that the user is not present at the computing device and taking additional security measures.

8. The method of claim 1, further comprising, if the user does not respond to the prompt or MFA interactions, determining, by the security agent, that the user is not present at the computing device and taking additional security measures.

9. The method of claim 1, wherein the security agent provides the prompt to a display of an administrative user device and enables the MFA provider to interact with the administrative user device to authenticate an administrative user.

10. The method of claim 1, wherein providing the prompt to the display of the user comprises providing the prompt to a display of the computing device or providing the prompt to a display of a device of the user that is used by the MFA provider for MFA.

11. A non-transitory computer storage medium having programming instructions stored thereon that, when executed by a processor of a computing device, implement a security agent to perform operations comprising:
    determining that a security trigger has occurred on the computing device;
    delaying action of a process associated with the security trigger;
    providing, to a display of a user of the computing device, a prompt asking if the security trigger resulted from an action of the user;
    initiating a multifactor authentication (MFA) with an MFA provider to authenticate the user;
    taking action based on a user answer to the prompt and on a result of the MFA, wherein the user answer is provided separately from the MFA or through successful completion of the MFA; and at least one of:
        whitelisting the process when the result of the MFA indicates successful authentication of the user and the user answer indicates that the security trigger resulted from an action of the user; or
        blacklisting the process when the result of the MFA indicates successful authentication of the user and the user answer indicates that the security trigger did not result from an action of the user.

12. The non-transitory computer storage medium of claim 11, wherein the security trigger is one of a local security authority subsystem service (lsass) dump, access to a sensitive file, or installation of a driver on the computing device.

13. The non-transitory computer storage medium of claim 11, wherein taking the action comprises allowing the action of the process to proceed when the result of the MFA indicates successful authentication of the user and the user answer indicates that the security trigger resulted from an action of the user.

14. The non-transitory computer storage medium of claim 11, wherein taking the action comprises blocking execution of the process (A) when the result of the MFA indicates failed authentication of the user or (b) when the result of the MFA indicates successful authentication of the user and the user answer indicates that the security trigger did not result from an action of the user.

15. The non-transitory computer storage medium of claim 11, wherein the operations further comprise, (A) in response to a threshold number of successive results of MFA indicating failed authentication or (B) if the user does not respond to the prompt or MFA interactions, determining that the user is not present at the computing device and taking additional security measures.

16. A computing device comprising:
a processor;
a display, communicatively coupled to the processor; and
a security agent configured to be operated by the processor to perform operations including:
- determining that a security trigger has occurred on the computing device;
- delaying action of a process associated with the security trigger;
- providing, to the display, a prompt to a user of the computing device asking if the security trigger resulted from an action of the user;
- initiating a multifactor authentication (MFA) with an MFA provider to authenticate the user;
- taking action based on a user answer to the prompt and on a result of the MFA, wherein the user answer is provided separately from the MFA or through successful completion of the MFA; and at least one of:
  - whitelisting the process when the result of the MFA indicates successful authentication of the user and the user answer indicates that the security trigger resulted from an action of the user; or
  - blacklisting the process when the result of the MFA indicates successful authentication of the user and the user answer indicates that the security trigger did not result from an action of the user.

17. The computing device of claim 16, wherein taking the action comprises allowing the action of the process to proceed when the result of the MFA indicates successful authentication of the user and the user answer indicates that the security trigger resulted from an action of the user.

18. The computing device of claim 16, wherein taking the action comprises blocking execution of the process (A) when the result of the MFA indicates failed authentication of the user or (b) when the result of the MFA indicates successful authentication of the user and the user answer indicates that the security trigger did not result from an action of the user.

19. The computing device of claim 16, wherein the security trigger is one of a local security authority subsystem service (lsass) dump, access to a sensitive file, or installation of a driver on the computing device.

20. The computing device of claim 16, wherein the security trigger and the action are determined by a configuration or policy of the security agent.

* * * * *